US006255266B1

(12) United States Patent
Gupta et al.

(10) Patent No.: US 6,255,266 B1
(45) Date of Patent: Jul. 3, 2001

(54) ALKYLDIONE PEROXIDES AS CLEANING SOLUTIONS FOR WAFER FABS

(75) Inventors: Subhash Gupta; Simon Choo I; Mei Sheng Zhou; Paul Ho, all of Singapore (SG)

(73) Assignee: Chartered Semiconductor Manufacturing Ltd., Singapore (SG)

( * ) Notice: Subject to any disclaimer, the term of this patent is extended or adjusted under 35 U.S.C. 154(b) by 0 days.

(21) Appl. No.: 09/659,728

(22) Filed: Sep. 11, 2000

Related U.S. Application Data

(62) Division of application No. 09/467,132, filed on Dec. 20, 1991, now Pat. No. 6,132,521.

(51) Int. Cl.[7] ................................ C11D 9/04; C11D 3/00; C11D 7/18; C03C 23/00

(52) U.S. Cl. .......................... 510/175; 510/372; 510/375; 134/2

(58) Field of Search .................................... 510/175, 372, 510/375; 134/2

(56) References Cited

U.S. PATENT DOCUMENTS

| | | | | |
|---|---|---|---|---|
| 4,714,517 | * | 12/1987 | Malladi et al. | 156/629 |
| 4,814,408 | * | 3/1989 | Itoh et al. | 528/24 |
| 5,650,356 | * | 7/1997 | Grivna et al. | 437/194 |
| 5,882,433 | * | 3/1999 | Ueno | 134/31 |
| 6,106,853 | * | 8/2000 | Cox et al. | 424/405 |
| 6,132,521 | * | 10/2000 | Gupta et al. | 134/2 |

* cited by examiner

*Primary Examiner*—Yogendra N. Gupta
*Assistant Examiner*—John M Petruncio
(74) *Attorney, Agent, or Firm*—George O. Saile; Rosemary L. S. Pike

(57) ABSTRACT

A method of cleaning elemental copper, cobalt, or nickel from the surface of equipment hardware without corroding or damaging the equipment parts and surfaces in the event of wafer breakage and non-wafer breakage is described. A solution comprising an alkyldione peroxide, a stabilizing agent, and alcohols is used to oxidize the metal and form soluble complexes which are removed by the cleaning solution. Also, a novel alkyldione peroxide solution for cleaning elemental copper, cobalt, or nickel from the surface of equipment hardware in the event of wafer breakage and non-wafer breakage is provided.

7 Claims, No Drawings

ALKYLDIONE PEROXIDES AS CLEANING SOLUTIONS FOR WAFER FABS

This is a division of patent application Ser. No. 09/467,132, filing date Dec. 20, 1990, U.S. Pat. No. 6,132,521 Alkyldione Peroxides As Cleaning Solutions For Wafer Fabs, assigned to the same assignee as the present invention.

BACKGROUND OF THE INVENTION (1) Field of the Invention

The invention relates to a method of cleaning equipment surfaces in the fabrication of integrated circuits, and more particularly, to a method of cleaning copper, cobalt, or nickel from equipment surfaces in the manufacture of integrated circuits.

(2) Description of the Prior Art

Management of copper contamination is an important aspect of future high-tech wafer fabs. The current procedure of cleaning broken wafers that incorporate copper films (100% copper) in multi-level interconnects is to wipe the effected equipment parts with isopropyl alcohol (IPA) and/or use a vacuum hose to suck out broken pieces. However, IPA does not dissolve copper, so copper remnants will still exist in the equipment. Furthermore, copper pieces on wipes, gloves, and cleanroom suits may accidentally contaminate wafer processing. The aforementioned contamination is also applicable to cobalt and nickel.

U.S. Pat. No. 4,714,517 to Malladi et al teaches copper cleaning using a mild organic acid solution. TMAH cleaning is also mentioned. U.S. Pat. No. 5,882,433 to Ueno discloses a spin-cleaning method using IPA. U.S. Pat. No. 5,650,356 to Grivna et al teaches a hydrogen peroxide solution to prevent corrosion on metal surfaces. U.S. Pat. No. 4,814,408 to Itoh et al discloses a self-adhering silicone composition including alkyldione peroxides.

SUMMARY OF THE INVENTION

A principal object of the present invention is to provide an effective and very manufacturable method of cleaning metals from equipment surfaces in the fabrication of integrated circuits.

Another object of the invention is to provide a method of cleaning metals from equipment surfaces without corroding or destroying the parts and surfaces of the equipment.

Another object of the invention is to provide a method of cleaning elemental copper from the surface of equipment hardware in the event of wafer breakage without corroding or destroying the parts and surfaces of the equipment.

Yet another object of the invention is to provide a method of cleaning elemental copper, cobalt, or nickel from the surface of equipment hardware in the event of wafer breakage without corroding or destroying the parts and surfaces of the equipment.

Yet another object of the invention is to provide a method of cleaning elemental copper from the surface of equipment hardware in the event of wafer breakage using a novel alkyldione peroxide solution without corroding or destroying the parts and surfaces of the equipment.

A further object of the invention is to provide a method of cleaning elemental copper, cobalt, or nickel from the surface of equipment hardware in the event of wafer breakage using a novel alkyldione peroxide solution without corroding or destroying the parts and surfaces of the equipment.

A further object is to provide a novel alkyldione peroxide solution for cleaning elemental copper, cobalt, or nickel from the surface of equipment hardware in the event of wafer breakage without corroding or destroying the parts and surfaces of the equipment.

A still further object is to provide a novel alkyldione peroxide solution for cleaning elemental copper, cobalt, or nickel from the surface of equipment hardware in non-wafer breakage events.

In accordance with the objects of this invention a method of cleaning elemental copper, cobalt, or nickel from the surface of equipment hardware in the event of wafer breakage is achieved. A solution comprising an alkyldione peroxide is used to oxidize the metal and form soluble complexes which are removed by the cleaning solution.

Also in accordance with the objects of the invention, a novel alkyldione peroxide solution for cleaning elemental copper, cobalt, or nickel from the surface of equipment hardware in the event of wafer breakage is provided without corroding or destroying the parts and surfaces of the equipment.

DESCRIPTION OF THE PREFERRED EMBODIMENTS

The cleaning process of the present invention proposes a better alternative to IPA cleaning of equipment in the event of wafer breakage. IPA does not dissolve copper or other metals, so metal remnants may remain on the equipment after wiping with IPA. Additionally, copper pieces, for example, may become attached to wipes, gloves, and cleanroom clothing, thus presenting a copper contamination problem in the manufacture of integrated circuits. The novel cleaning solution of the invention oxidizes copper and forms soluble complexes. This chemical methodology is excellent for cleaning elemental copper, as well as cobalt, nickel, elemental titanium, and titanium nitride from the surface of hardware equipment in the event of wafer breakage.

The novel cleaning solution of the present invention comprises an alkyldione peroxide dissolved in IPA or other alcohols. The alkyldione peroxide has a weight or volume percentage of 0.1–100% of the solution and may be contained in a wash bottle. The cleaning solution may then be sprayed onto wipes which are then used to remove the copper, cobalt, or nickel from the contaminated parts and surfaces of the equipment.

The alkyldione peroxides include, but are not restricted to the following: 2,4-pentanedione peroxide, 2,2,6,6-tetramethyl-3,5-heptanedione peroxide, 2,5-hexanedione peroxide, 2,4-hexanedione peroxide, 3,5-heptanedione peroxide, and others. These peroxides along with their non-peroxide counterparts, can be dissolved in IPA. The non-peroxide counterparts, such as 2,4-pentanedione, 2,2,6,6-tetramethyl-3,5-heptanedione, and 2,5-hexanedione, etc. may require the addition of hydrogen peroxide and dimethyl phthalate in alcohols. 2,4-pentanedione peroxide is available commercially from Aldrich Chemical Co., Inc (Milwaukee, Wis.) as a 34 weight % solution in dimethyl phthalate and proprietary alcohols. In this case, dimethyl phthalate is a non-active ingredient since it functions as a stabilizing agent. Other peroxides mentioned are not currently commercially available.

The process of the present invention provides a method for removing copper or other metals such as cobalt and nickel from the surface of equipment hardware in the event of wafer breakage. A novel alkyldione peroxide solution is employed to effectively remove the metal contamination. The alkyldione peroxide solution does not corrode nor damage the equipment parts and surfaces whereupon it is applied.

The process of the present invention can also be extended to the removal of copper or other metals such as cobalt and nickel in non-wafer breakage events. Such events include preventive maintenance and the instance after a wafer has been processed in the equipment.

While the invention has been particularly shown and described with reference to the preferred embodiments thereof, it will be understood by those skilled in the art that various changes in form and details may be made without departing from the spirit and scope of the invention.

What is claimed is:

1. A metal cleaning solution comprising an alkyldione peroxide.

2. The metal cleaning solution according to claim 1 wherein said solution further comprises one or more alcohols.

3. The metal cleaning solution according to claim 1 wherein said solution further comprises dimethyl phthalate or other stabilizing agent.

4. The metal cleaning solution according to claim 1 wherein said alkyldione peroxide is chosen from the group containing: 2,4-pentanedione peroxide, 2,2,6,6-tetramethyl-3,5-heptanedione peroxide, 2,5-hexanedione peroxide, 2,4-hexanedione peroxide and 3,5-heptanedione peroxide.

5. The metal cleaning solution according to claim 1 wherein said alkyldione peroxide comprises 0.1–100% weight or volume percentage of said solution.

6. The metal cleaning solution according to claim 1 wherein said metal comprises copper.

7. The metal cleaning solution according to claim 1 wherein said metal comprises one of the group containing copper, cobalt, nickel, titanium, and titanium nitride.

* * * * *

UNITED STATES PATENT AND TRADEMARK OFFICE

CERTIFICATE OF CORRECTION

PATENT NO. : 6,255,266 B1
DATED : July 3, 2001
INVENTOR(S) : Subhash Gupta, Simon Chooi, Mei Sheng Zhou, Paul Ho It is certified that error appears in the above-identified patent and that said Letters Patent is hereby corrected as shown below:

<u>Title page,</u>
Item [75], delete "Simon Choo I" and replace with -- Simon Chooi --.

Signed and Sealed this

Sixteenth Day of April, 2002

*Attest:*

JAMES E. ROGAN
*Director of the United States Patent and Trademark Office*

*Attesting Officer*